United States Patent [19]

Cousin et al.

[11] 4,176,735
[45] Dec. 4, 1979

[54] HIGH-SPEED APPARATUS FOR OFF-WINDING THREAD

[75] Inventors: Jacques V. L. Cousin; Marcel E. R. Decroix; Hyppolite P. Gouy, all of Wervicq-Sud, France

[73] Assignee: Cousin Freres S.A., Wervic-Sud, France

[21] Appl. No.: 824,742

[22] Filed: Aug. 15, 1977

Related U.S. Application Data

[63] Continuation of Ser. No. 621,505, Oct. 10, 1975, abandoned.

[30] Foreign Application Priority Data

Oct. 14, 1974 [FR] France .............................. 74 34412

[51] Int. Cl.² ............................................. F16D 67/06
[52] U.S. Cl. .................................... 192/12 D; 361/144
[58] Field of Search ................ 192/12 D, 17 C, 18 B, 192/84 R; 317/148.5 R; 310/100

[56] References Cited

U.S. PATENT DOCUMENTS

| | | | |
|---|---|---|---|
| 2,828,846 | 4/1958 | Viguers et al. | 192/12 D |
| 2,880,595 | 4/1957 | McGuffey et al. | 192/109 R X |
| 2,946,418 | 7/1960 | Leeson | 192/12 D |
| 3,329,247 | 7/1967 | Jaeschke | 192/18 B |
| 3,379,292 | 4/1968 | Grygerva | 192/12 D |
| 3,516,526 | 6/1970 | Seesselberg | 192/12 D |
| 3,704,770 | 12/1972 | Spencer | 192/84 R X |
| 3,989,129 | 11/1976 | Brandenstein | 192/84 R |
| 4,023,659 | 5/1977 | Arnold | 192/84 R |

*Primary Examiner*—Benjamin W. Wyche
*Attorney, Agent, or Firm*—Cooper, Dunham, Clark, Griffin & Moran

[57] ABSTRACT

An apparatus for off-winding thread which comprises a driving shaft, a drive means for rotating the driving shaft, a driven shaft, an electrically operated clutch interconnecting said driven and driving shaft, an electrically operated brake connected to said driven shaft, and an electronic control circuit. The control circuit comprises three parts connected to the said clutch and brake. The first part of the control circuit is connected to the said clutch and incorporates an integrating circuit for producing gradual engagement of the clutch. The second part of the control circuit is connected to the said brake and incorporates a pulse generating circuit for producing a large temporary braking force. The third part of the control circuit is also connected to the said brake and incorporates a constant signal generator for producing a small constant braking force.

12 Claims, 5 Drawing Figures

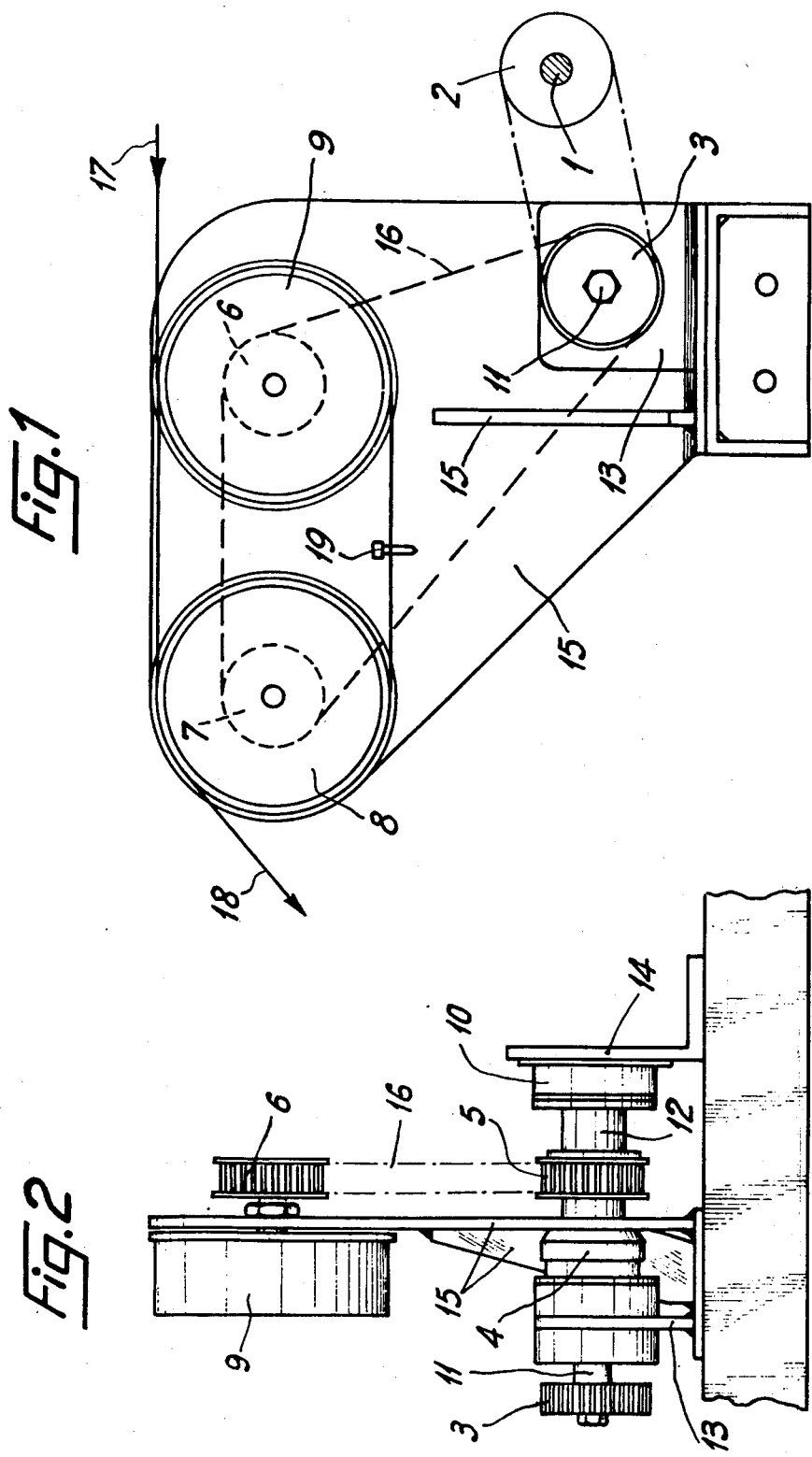

HIGH-SPEED APPARATUS FOR OFF-WINDING THREAD

This is a continuation of application Ser. No. 621,505 filed Oct. 10, 1975 now abandoned.

BACKGROUND OF THE INVENTION

In the spinning industry it is well-known that before obtaining the desired quality of thread that a given method of production can provide, it is often desirable to subject the thread, at a certain stage in its manufacture, to a chemical treatment, for example by causing it to pass into a suitable bath. For this purpose, the thread to be treated is unwound from a first bobbin, is passed into the treatment bath and is then rewound on a finishing bobbin. The thread is moved between the first and finishing bobbins by an off-winding apparatus disposed in the path of travel of the thread and generally between the treatment bath and the finishing bobbin.

Three problems arise when using an off-winding apparatus:

(1) it is necessary to start up the entire system at a progressively increasing speed to avoid breaking the thread;

(2) rapid braking is necessary, since it serves no purpose to allow the apparatus to continue to operate after the feed bobbin is empty; and (3) off-winding of the thread has to be carried out at a constant speed, even though the outside diameter of the thread wound on the bobbins varies during the operation, since it is necessary that each feed portion of the thread should dwell for the same length of time in the treatment bath. Furthermore a sudden change in the off-winding speed of the thread could cause it to be broken.

There is however a trend towards the use of off-winding apparatuses which operate at progressively increasing speeds for the purpose of reducing the time needed for an operation. In the case of off-winding apparatuses operating at off-winding speeds above 1000 meters/minute, it becomes impossible to use purely mechanical means such as variable-speed motors, which may operate satisfactorily on a permanent basis at relatively low off-winding speeds, in the order of 500 meters/minute, but which cannot be used at high speeds, in the order of 1000 meters/minute, and which also do not operate during changeover, that is to say during the start-up and braking stages, which are the most delicate stages of the operation.

An object of the present invention is to avoid these disadvantages by providing a regulable and controlled high-speed off-winding apparatus which enables gradual start-up to be achieved so as to avoid thread breakage which occurs when start-up is too sudden.

Another object of the present invention is to provide a braking system having two positions, namely one for rapid stopping and one in which the apparatus is maintained in the stopped position for enabling manual operations to be carried out.

Another object of the present invention is to provide an electronic control circuit for a clutch-brake arrangement.

SUMMARY OF THE INVENTION

According to the present invention an apparatus for off-winding thread comprises a driving shaft, a drive means for rotating the driving shaft, a driven shaft, an electrically operated clutch interconnecting said driven and driving shafts, an electrically operated brake connected to said driven shaft, and an electronic control circuit comprising a first part connected to said clutch and incorporating an integrating circuit for producing gradual engagement of the clutch, a second part connected to said brake and incorporating a pulse generating circuit for producing a large temporary braking force, and a third part connected to said brake and incorporating a constant signal generator for producing a small constant braking force.

The apparatus for off-winding thread in accordance with the invention and equipped in this manner can be started up gradually with the aid of the first part of the electronic control circuit which progressively energizes the clutch and permits the off-winding apparatus to reach the required running speed without jolting; furthermore the apparatus can be rapidly slowed down with the aid of the second part of the electronic circuit which enables a voltage, which is both high and of short duration, to be applied to the control winding of the brake; and finally the apparatus can be braked on a permanent basis with the aid of the third part of the electronic circuit which enables a low permanent voltage to be applied to the control winding of the brake so as to counteract any stray couples that may occur.

BRIEF DESCRIPTION OF THE DRAWINGS

FIG. 1 is a front view of a high-speed apparatus for off-winding thread;

FIG. 2 is an end view of the apparatus of FIG. 1;

Identical elements are designated by the same reference numerals in the various Figures.

DESCRIPTION OF THE INVENTION

Figure 3:
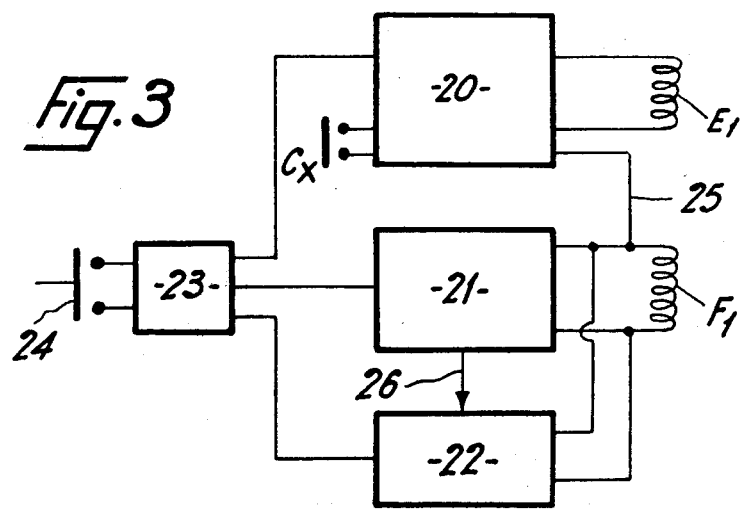
FIG. 3 is a block diagram showing a control circuit in accordance with the invention.

Referring to FIGS. 1 and 2, the high-speed apparatus for off-winding thread comprises a driving shaft 11 and a driven shaft 12. The driving shaft 11, supported by a rigid frame 13, carries a driving pulley 3 and the first part of an electro-magnetic clutch 4. The driving pulley 3 is driven by a variable-speed motor illustrated diagrammatically in FIG. 1, through the shaft 1 of the motor and through a driving pulley 2. The driven shaft 12, supported by a rigid frame 14, carries a pulley 5, mounted on ball- or roller-bearings, an electro-magnetic brake 10 and the second part of the electro-magnetic clutch 4. The off-winding apparatus proper is carried by a rigid frame 15 and comprises two driven pulleys 6 and 7 associated respectively with live rollers 8 and 9. The driven pulleys 6 and 7 are caused to rotate by the pulley 5, mounted on ball- or roller-bearings, to which they are connected by any suitable known driving means such as a toothed belt or chain 16. The thread which is to be off-wound from a first bobbin, not illustrated, and to be rewound on to a second bobbin, likewise not illustrated, after having been subjected to a suitable treatment, reaches the off-winding apparatus at 17 and passes therefrom at 18 after having made several turns round the assembly consisting of the two live rollers 8 and 9. A comb 19 is disposed at right-angles to the lower tangent common to the rollers 8 and 9. The comb extends parallel to the axes of these rollers and it is so arranged that its teeth separate the various strands of the thread wound on the rollers 8 and 9, so as to prevent any tangling.

The mode of operation of such an apparatus is obvious, and does not require to be further described. The most delicate phases of the operation are starting-up and braking. Furthermore, experience has shown that stray couples act on the shafts as a result of the use of electro-magnetic elements 4 and 10 for the clutch and for the brake. These couples necessitate the maintenance of a slight permanent braking action after the heavy braking action has been completed, so as to enable any subsequent manual operation to be carried out without danger.

FIG. 3 illustrates in block form a circuit in accordance with the invention which enables the various operations of the off-winding apparatus, illustrated in FIGS. 1 and 2, to be controlled in a satisfactory manner. In this embodiment, the control circuit mainly comprises three parts 20, 21 and 22; the first part 20 is connected by its output to the terminals of the control winding $E_1$ of the electro-magnetic clutch 4. This first part 20 comprises a circuit-breaker $C_x$ and an integrating circuit, the time-constant of which determines the time required by the off-winding apparatus to reach its normal running speed. The second part 21 is connected by its output to the terminals of the control winding $F_1$ of the electro-magnetic brake 10. This second part 21 comprises a generator for producing an impulse of predetermined dimensions, which has a time-constant which determines the length of the impulse. Furthermore, the control winding $F_1$ of the electro-magnetic brake is connected through a conductor 25 to the first circuit part 20 for preventing simultaneous operation of the windings $E_1$ and $F_1$. The third part 22 of the electronic circuit is likewise connected by its output to the terminals of the control winding $F_1$ of the electro-magnetic brake. This third part 22 comprises a stepped voltage generator, and there is a connection 26 between the circuits 21 and 22 for causing them to operate in succession rather than simultaneously. The inputs of the three circuit parts 20, 21 and 22 are connected in parallel to a supply 23 having a main switch 24.

The mode of operation of the control circuit shown in FIG. 3 will now be described by reference to FIG. 4 which illustrates the changes in the voltage V as a function of time T, in the various parts of the circuit.

Figure 4:
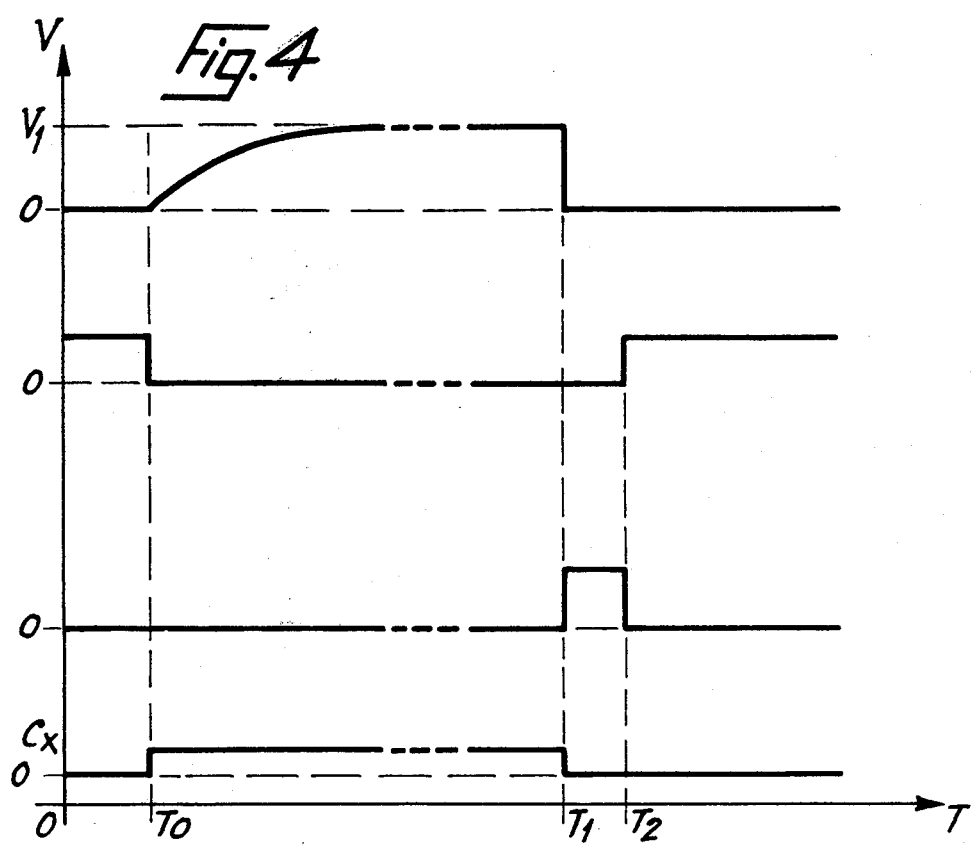
FIG. 4 is a diagram for explaining the mode of operation of the control circuit shown in FIG. 3.

In FIG. 4 the curves represent, from top to bottom: the voltage applied by the circuit 20 to the control winding $E_1$ of the clutch; the slight braking voltage applied by the circuit 22 to the control winding $F_1$ of the brake; the heavy braking voltage applied by the circuit 21 to the control winding $F_1$ of the brake; and the respective opening and closing periods of the circuit breaker $C_x$.

If the main switch 24 is closed, the circuit parts 20, 21 and 22 receive current. Since the circuit breaker $C_x$ is open, current cannot be supplied to the winding $E_1$. The winding $F_1$ receives current through the third circuit part 22 which sets up a low permanent voltage through the winding $F_1$ and ensures a slight braking action as represented by the second curve in FIG. 4. The establishment of the slight braking action prevents, by way of the connection 26, operation of the second circuit part.

At the next point in time $T_o$, the circuit breaker $C_x$ is closed. The circuit shown in FIG. 3 is so designed that the entire supply voltage available is then taken up by the integrating circuit of the first circuit part 20 which then applies a rapidly increasing voltage to the terminals of the control winding $E_1$ until a permanent running speed is established which corresponds to a given voltage $V_1$ and therefore to a fixed rate of revolution of the driving rollers 8 and 9 of the off-winding apparatus. The connection between the first circuit part 20 and the control winding of the brake $F_1$ prevents operation of the circuit parts 21 and 22 when the circuit 20 is operating.

The brake $F_1$ is completely de-energized as long as the clutch is functioning.

If the circuit breaker $C_x$ is opened at the time $T_1$, the first circuit part 20 immediately ceases to function, the clutch is disengaged and the entire voltage from the supply source is applied to the second circuit part 21 which produced and immediately applies an electrical impulse of considerable magnitude to the control winding $F_1$ of the brake which reacts by applying a heavy braking action which stops the off-winding apparatus. The connection 26 between the circuit parts 21 and 22 prevents operation of the third circuit part 22 during this time. The heavy braking impulse applied to the control winding $F_1$ of the brake by the circuit part 21 ceases at the time $T_2$ on account of the connection 26 between the circuit parts 21 and 22, and a slight permanent braking voltage produced by the third circuit part 22 replaced the previous heavy braking action and is permanently applied to the control winding of the brake $F_1$ to prevent any rotation of the off-winding apparatus under the effect of transient stray couples. This situation continues as long as the main switch 24 is closed and the circuit breaker $C_x$ is open. A succession of events identical to that just described occurs again when the circuit breaker $C_x$ is closed.

It will thus be seen from the above description that with the aid of the control circuit in accordance with the invention and upon closing of the circuit breaker $C_x$, the off-winding apparatus begins to turn at a speed which increases evenly and gradually without jolting until it assumes a normal running speed which it maintains in a uniform manner until the circuit breaker $C_x$ is opened. Then, immediate and quite fierce braking occurs which completely immobilizes the off-winding apparatus, but this constitutes no disadvantages since the entire thread has by then been off-wound and rewound on to the last bobbin so that this rapid braking action does not result in any danger of the thread being broken. Once this almost instantaneous braking action has been carried out, a slight permanent braking action is applied to the driven shaft 12, and this allows any manual operations to be carried out without danger on the off-winding apparatus, for example the fitting of a new thread round the rollers 8 and 9.

Figure 5:
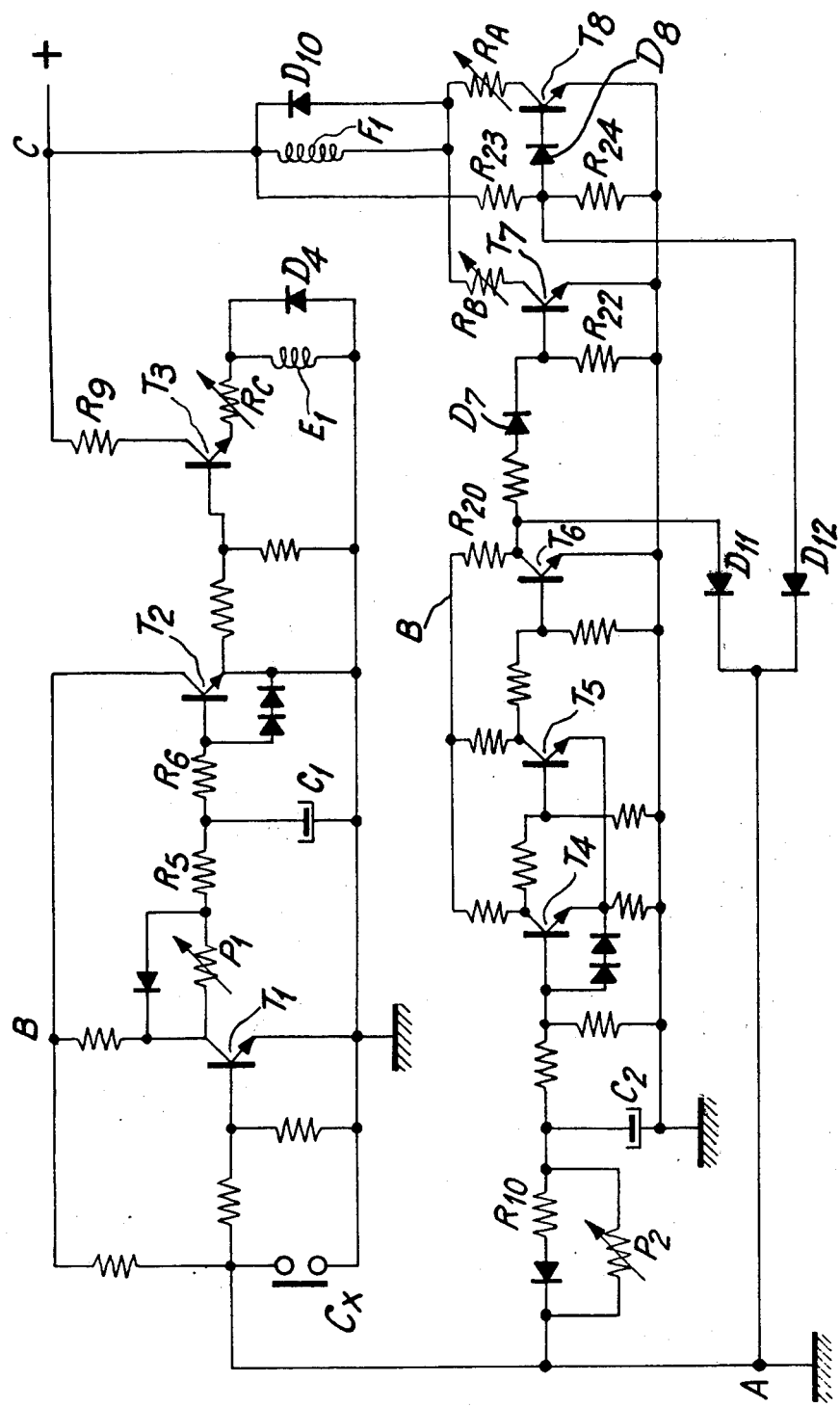
FIG. 5 is a circuit diagram for the brake and clutch control circuit seen in FIG. 3.

FIG. 5 is a circuit diagram of an electronic circuit employing the operational principles described by reference to FIGS. 3 and 4. The various circuit parts illustrated in FIG. 3 will again be seen in FIG. 5, namely:

the first part 20 which corresponds to the circuit part lying between the circuit breaker $C_x$ and the clutch winding $E_1$.

This comprises in succession: a transistor amplifying stage $T_1$; a transistor integrating stage $T_2$; and a transistor amplifying stage $T_3$, the clutch winding $E_1$ being in the circuit of the emitter of the transistor $T_3$ in series with a variable resistor $R_c$. The time required for establishing the normal running voltage at the terminals of the control winding $E_1$ of the clutch depends upon the time constant of the integrating stage which comprises three series resistors $P_1$, $R_5$ and $R_6$, one of which, $P_1$, is variable, and an earthed capacitor $C_1$. The slope of the curve for the establishment of the normal running speed or the off-winding apparatus depends upon the rating of the resistor $P_1$.

The second part 21 comprises a time constant arrangement at the input consisting of a fixed resistor $R_{10}$, a variable parallel resistor $P_2$ and a capacitor $C_2$, the time constant of which controls the length of the impulse and therefore the duration of the heavy breaking action. This time constant arrangement is followed by a double transistor stage $T_4$, $T_5$ for adapting impedance and having a follower emitter, and then by a transistor preamplifying stage $T_6$ and by a final transistor amplifying stage $T_7$, the winding $F_1$ of the brake being in the circuit of the collector of the transistor $T_7$ in series with a variable resistor $R_B$.

It will be seen that this control winding $F_1$ of the brake is also incorporated in the circuit of the collector of the transistor $T_3$ of the final stage of the first circuit part 20 in series with a resistor $R_9$. The presence of parallel diodes $D_4$ and $D_{10}$ in each of the windings $E_1$ and $F_1$ and operating in the opposite direction with respect to the transistor $T_3$ prevents the simultaneous flow of current in the two windings.

The third part 22 consists mainly of two series transistor stages $T_7$ and $T_8$, the first stage being common to the second part 21 and this part; the second amplifying stage $T_8$ is connected to the output of the first, $T_7$, through a voltage divider $R_{23}$-$R_{24}$, the control winding $F_1$ of the brake being common to the two circuits of the collectors of the transistors $T_7$ and $T_8$ and being connected in series with them through respective variable resistors $R_B$ and $R_A$. Diodes $D_7$, $D_8$, $D_{11}$ and $D_{12}$ enable the applied voltages to be smoothed to impart to them the required value and polarity.

The input of the stage $T_7$ and the input of the stage $T_8$ are connected to earth through diodes $D_{11}$ and $D_{12}$. The necessary interconnection of the circuit parts 21 and 22 is achieved with the aid of the stage $T_7$ which is common to these two circuit parts.

This circuit operates precisely in the manner described with the aid of FIGS. 3 and 4. The connection 25 shown in FIG. 3 corresponds to the arrangement of the control winding $F_1$ of the brake in series with the collector of the transistor $T_3$, the emitter of which is in series with the control winding $E_1$ of the clutch.

The supply source is not illustrated. It can however just be stated that the above-described circuit operates perfectly satisfactorily with a continuous voltage source of 24 V applied between the points A and C.

All the transistors in this arrangement are of the n-p-n type. It is quite obvious that this is not to be regarded as constituting any limitation, and that it will be within the competence of the person skilled in the art to design arrangements using operating components other than the n-p-n transistors as specified above.

Whilst the control circuit has been described with reference to an apparatus for off-winding thread, it can be applied to any brake-clutch arrangement.

It will be readily apparent to those skilled in the art that the foregoing invention may be modified as desired. The embodiment shown and described is thus considered to be illustrative only and not restrictive.

We claim:

1. An apparatus for off-winding thread comprising a driving shaft, a drive means for rotating the driving shaft, a driven shaft, an electrically operated clutch interconnecting said driven and driving shafts, an electrically operated brake connected to said driven shaft, and an electronic control circuit comprising a first part connected to said clutch and incorporating an integrating circuit for producing gradual engagement of the clutch, a second part connected to said brake and incorporating a pulse generating circuit for producing a large temporary braking force, and a third part connected to said brake and incorporating a constant signal generator for producing a small constant braking force, wherein said brake and clutch are electro-magnetically operated and each has a control winding appropriately connected to said control circuit, said control winding of said brake is also connected to an output of said first part of the electronic control circuit, and diode means are coupled to said control winding of the clutch and said control winding of the brake in such a manner that current can flow through only one of these windings at a given moment.

2. An apparatus for off-winding thread according to claim 1, wherein the second circuit part has an output stage common to the second and to said third part, and the third part has an output stage which is connected to the brake and is connected to said output stage of the second part through a voltage divider.

3. An apparatus according to claim 1, wherein said second and third parts each have an output component for controlling current in said control winding of the brake, and said first part has an output component for controlling current in said control winding of the clutch, the control winding of the brake being connected to an electrode of one type on each of the said output components of said second and third parts and the control winding of the clutch being connected to an electrode of another type on said output component of said first part.

4. An apparatus for off-winding thread according to claim 3, wherein the output component of the first part of the electronic circuit has the control winding of the clutch in series with one of its electrodes, and the control winding of the brake in series with a second electrode.

5. An apparatus for off-winding thread comprising a driving shaft, a drive means for rotating the driving shaft, a driven shaft, an electrically operated clutch interconnecting said driven and driving shafts, an electrically operated brake connected to said driven shaft, and an electronic control circuit comprising a first part connected to said clutch and incorporating an integrating circuit for producing gradual engagement of the clutch, a second part connected to said brake and incorporating a pulse generating circuit for producing a large temporary braking force, and a third part connected to said brake and incorporating a constant signal generator for producing a small constant braking force, wherein said integrating circuit includes means for varying the integration time of the circuit.

6. An apparatus for off-winding thread according to claim 5, wherein said second part of the electronic circuit comprises an R-C time-constant arrangement which determines the length of said pulse.

7. An apparatus for off-winding thread comprising a driving shaft, a drive means for rotating the driving shaft, a driven shaft, an electrically operated clutch interconnecting said driven and driving shafts, an electrically operated brake connected to said driven shaft, and an electronic control circuit comprising a first part connected to said clutch and incorporating an integrating circuit for producing gradual engagement of the clutch, a second part connected to said brake and incorporating a pulse generating circuit for producing a large temporary braking force, and a third part connected to said brake and incorporating a constant signal generator for producing a small constant braking force, wherein the electronic control circuit incorporates active components which are all of the same type, and said active components are bipolar transistors.

8. An electronic control circuit for controlling a clutch-brake arrangement, comprising a first part connectable to a clutch and incorporating an integrating circuit for producing gradual engagement of said clutch, a second part connectable to a brake and incorporating a pulse generating circuit for producing a large temporary braking force, and a third part connectable to said brake and incorporating a constant signal generator for producing a small constant braking force, wherein said integrating circuit includes means for varying the integration time of the circuit.

9. An electronic control circuit according to claim 8, wherein said second part has an output stage common to said second part and to said third part, and the third part has an output stage which is connectable to said brake and is connected to said output stage of the second part through a voltage divider.

10. An electronic control circuit according to claim 8, wherein said second part of the electronic circuit comprises an R-C time-constant arrangement which determines the length of said pulse.

11. An electronic control circuit for controlling a clutch-brake arrangement, comprising a first part connectable to a clutch and incorporating an integrating circuit for producing gradual engagement of said clutch, a second part connectable to a brake and incorporating a pulse generating circuit for producing a large temporary braking force, and a third part connectable to said brake and incorporating a constant signal generator for producing a small constant braking force, wherein the electronic control circuit incorporates active components which are all of the same type, and said active components are bipolar transistors.

12. An electronic control circuit according to claim 8, wherein said first and second and third parts are operable normally to apply a slight braking force at all times except when said clutch is under engagement and when said brake is undergoing said large temporary braking force, and said clutch engagement and said large temporary braking are mutually exclusive.

* * * * *